(12) United States Patent
Taplan et al.

(10) Patent No.: US 7,721,572 B2
(45) Date of Patent: May 25, 2010

(54) METHOD FOR RESHAPING GLASS-CERAMIC ARTICLES, APPARATUS FOR PERFORMING THE METHOD AND GLASS-CERAMIC ARTICLES MADE THEREBY

(75) Inventors: Martin Taplan, Rheinboellen (DE); Herwig Scheidler, Mainz (DE); Ioannis Kosmas, Stadecken-Elsheim (DE); Friedrich-Georg Schroeder, Ingelheim (DE); Wolfgang Schmidbauer, Mainz (DE); Torsten Gabelmann, Wiesbaden (DE); Dieter Schoenig, Mainz (DE)

(73) Assignee: Schott AG, Mainz (DE)

( * ) Notice: Subject to any disclaimer, the term of this patent is extended or adjusted under 35 U.S.C. 154(b) by 1127 days.

(21) Appl. No.: 11/063,217

(22) Filed: Feb. 22, 2005

(65) Prior Publication Data

US 2005/0183456 A1   Aug. 25, 2005

(30) Foreign Application Priority Data

Feb. 21, 2004   (DE)   .................. 10 2004 008 595

(51) Int. Cl.
  *C03B 23/035*   (2006.01)
(52) U.S. Cl. ............................. 65/107; 65/106; 65/33.1
(58) Field of Classification Search .................. 65/33.1, 65/106, 107, 81, 63, 102, 110, 64
  See application file for complete search history.

(56) References Cited

U.S. PATENT DOCUMENTS

| | | | |
|---|---|---|---|
| 2,377,849 A * | 6/1945 | Binkert et al. ................. 65/103 |
| 4,229,201 A * | 10/1980 | Comperatore et al. ......... 65/287 |
| 5,549,100 A | 8/1996 | Heisner et al. | |
| 5,931,152 A | 8/1999 | Fafet et al. | |
| 6,120,282 A | 9/2000 | Vilato et al. | |
| 6,209,534 B1 | 4/2001 | Taplan | |
| 6,321,570 B1 * | 11/2001 | De Vries et al. ............... 65/104 |
| 2002/0121112 A1* | 9/2002 | Schroeder et al. ............. 65/106 |
| 2006/0230790 A1* | 10/2006 | Yli-Vakkuri .................. 65/269 |

FOREIGN PATENT DOCUMENTS

| | | |
|---|---|---|
| DE | 43 33 334 A1 | 4/1995 |
| DE | 198 13 691 C1 | 6/1999 |
| DE | 199 06 911 C1 | 7/2000 |
| DE | 100 47 576 A1 | 4/2002 |
| DE | 101 02 576 A1 | 8/2002 |
| EP | 0 879 797 A1 | 11/1998 |
| EP | 0 834 044 B1 | 8/2002 |
| JP | 08294891 A * | 11/1996 |
| WO | 97/00407 | 1/1997 |

* cited by examiner

*Primary Examiner*—Steven P Griffin
*Assistant Examiner*—Queenie Dehghan
(74) *Attorney, Agent, or Firm*—Michael J. Striker

(57) ABSTRACT

The apparatus performs a forced reshaping of a flat green glass part during a ceramicizing process in which the viscosity of the glass is temporarily lowered due to crystallization heat. The apparatus includes a continuous furnace (3) for the ceramicizing process: a reshaping device (2') provided with activating openings (6); and vertically movable pressure-operated reshaping tools (9) arranged in the reshaping device (2'). The furnace (3) is provided with lateral openings (4) for temporarily connecting activating lines (8) to the activating openings (6) of the reshaping device (2') in a sealed manner in order to operate the reshaping tools (9) by supplying pressurized air to the reshaping device or by producing a low pressure in the reshaping device (2').

8 Claims, 3 Drawing Sheets

METHOD FOR RESHAPING GLASS-CERAMIC ARTICLES, APPARATUS FOR PERFORMING THE METHOD AND GLASS-CERAMIC ARTICLES MADE THEREBY

BACKGROUND OF THE INVENTION

1. Field of the Invention

The invention relates to methods of making reshaped flat glass-ceramic parts or articles by forced reshaping of a corresponding green glass part during the ceramicizing process. The reshaping can be partial or full surface. The invention also relates to an apparatus for performing the method and to the glass-ceramic articles made by the method.

2. Related Art

Glass-ceramic parts or articles in the form of glass-ceramic plates are typically used to provide cooking surfaces in modern cooking ranges and as viewing windowpanes for oven, range and fireplace.

For many years cooking ranges with glass-ceramic cooking surfaces and/or covers have been known in the prior art. The cooking ranges with the glass-ceramic cooking surfaces have been marketed because of their specific properties. They have long-lasting resistance to high temperature differences, surface strength and friendliness to cleaning materials, in addition to their desirable aesthetic properties. Typically the glass-ceramic cooking surfaces are used for heating cooking zones and the like with electric cooking elements and gas burners, including both atmospheric gas burners set in the cooking surfaces, and also with radiant burners under the cooking surface. In more recent times also more and more inductively heated cooking devices have been marketed.

It is also possible to prepare food directly on a glass-ceramic cooking surface, e.g. by grilling, besides using these glass-ceramic cooking surfaces for indirect food preparation, i.e. for heating of food in a cooking vessel or container. The glass-ceramic plates for the above-mentioned cooking surfaces are usually made in a continuous melt process, in which a starting glass is first rolled to its nominal thickness and is then cut to the appropriate cooking surface size. In this state the starting material is called green glass or precursor glass. In a second manufacturing step additional edge working occurs, the drilling and decorating, and subsequently thermal treatment, namely the ceramicizing. These processing steps produce the glass-ceramic with its characteristic properties (high temperature resistance and low thermal expansion).

The cooking ranges currently marketed with glass-ceramic plates providing cooking surfaces in gas cooking ranges with atmospheric burners a cover can be provided) typically have continuous plane surfaces. However many special cooking unit embodiments can only be made with considerably greater expense or effort or for limited applications. A series of proposals has been made for improvements in cooking surfaces, especially by partial reshaping. Glass-ceramic plates, especially with partially reshaped regions, thus have attained ever greater importance on the market.

Edges of holes for receiving open, i.e. atmospheric, gas burners in cooking surfaces typically pose a problem. This sort of cooking range typically must be protected with an additional sealing collar around the edge of each hole for overflowing cooking materials or cleaning liquids. It has also been known to bend up the edges of the holes in an expensive bending process as a substitute for the sealing collars. That means that a reshaped raised region is provided around the edge of each hole, as e.g. described in DE 198 13 691 C1.

Furthermore it has been suggested in DE 43 33 334 C2 to fold or bend the region around the hole for the atmospheric gas burner up from the main plane of the cooking surface to form a truncated conical, spherical or circular conical section or to from a prism, tetrahedron, pyramid and/or other section. An arrangement of this sort has, among others, the advantage that scarcely any further measures are required for sealing of the gas burner from the cooking surface (e.g. as a protection against overflowing cooking materials) and also the cleaning of the cooking surface at the transition region from the cooking surface to burner is essentially simplified.

Further desirable shaping of glass-ceramic cooking surfaces results, for example, from the need to fix the cooking grates over the gas burners and to protect switch surfaces from overflowing cooking material or from unintended impacts due to sliding of pots and other cooking vessels according to DE 199 06 911 C1.

Also shaping and reshaping can have functional and aesthetic advantages for viewing windowpanes used in ovens, ranges and fireplaces. For this purpose these panes are already reshaped currently by sinking into a shape under their own weight during a ceramicizing process or before that in a green glass condition by bending or folding or vacuum deep drawing with rapid heating by means of a gas burner or infrared heating. A series of methods for making partial-surface or full-surface glass-ceramic plates are known, of which two typical methods are described next.

WO 97/00407 (=EP 0 834 044 B1) describes a method of reshaping a glass-ceramic plate, especially providing a glass-ceramic cooking surface. For this purpose a glass plate is made in a plastic state with a width, which is larger than that of the cooking surface to be formed, and which has a viscosity of 1000 to 5000 Pas, with the help of a melted precursor (green glass) mass for the glass ceramic by rolling the previously melted glass between rollers. Then the pasty glass sheet or disk is conveyed to a surface of a mold, which is equipped with vacuum devices, so that this glass disk covers the above-described shaping surface, which contains a number of impressions of bulges. The glass disk is then pulled against the surface of the mold by the suction or vacuum produced by a suction apparatus. The parts of the glass disk, which protrude through the surface of the mold, are cut away so that a shaped disk of the green glass is obtained. Subsequently the shaped glass plate or disk is subjected to a heat treatment for ceramicizing it and is converted to a shaped glass-ceramic plate.

This known manufacturing process has the disadvantage that the melt vessel, the rollers and the shaping parts can only be used for this shaping process. The special and very expensive mold permits economical production of only a very large number of individual products.

An additional disadvantage is the visible damage of the plate underside, i.e. the surface in contact with the mold, produced by the method. This surface is covered by a leathery structure formed by shrinkage and flow waves, depending on the existing temperature conditions after the rolling process. This not only interferes with the usually desired aesthetics of the cooking surface, but it also causes strength reductions.

EP 0 879 797 describes a method for introduction of raised portions and depressions in a glass-ceramic cooking surface, which comprises a partial sinking of a bar or cylindrical disk supported on a partially underlying supporting mold during the ceramicizing process, but only because of the action of gravity. A reshaping process occurring because of the force of gravity alone is also disclosed in DE 101 02 576 A1.

In this known reshaping method by sinking due to gravity during ceramicizing a partial reshaping is possible, but only with very great limitations. Only very "soft" reshaping with very large tapering radii can occur. Small local borders, like for example are required for control functions or centering mushrooms for pot support fixtures, cannot be produced with this method. Because of the large tapering radii it is not possible to use this method for electric cooking surfaces, since the planarity of the cooking zones is negatively influenced, which could lead to a reduction in the performance of the cooking apparatus.

DE 100 47 576 A1 discloses a method for reshaping a "glass-ceramic blank", i.e. a green glass body, during its ceramicizing by a forced reshaping. The forced reshaping can occur by vacuum sinking, by means of a pressing tool or by blowing pressurized air into the respective hollow mold. The green glass body is placed in an IR radiating body equipped with an IR radiator and is heated there to the required temperatures and reshaped. This reference describes a discontinuous process, in which the individual treatments of the green glass body are performed in separate processing steps. The plane green glass plate is put in an IR radiating chamber as a single piece. After that the radiating chamber is heated by means of the IR radiator, the reshaping takes place, and subsequently ceramicizing is performed. Then the process concludes by cooling down the radiating chamber and removing the ceramic plate. This process is comparatively uneconomical because of the discontinuous individual treatment of the green glass plate to be ceramicized.

SUMMARY OF THE INVENTION

It is an object of the present invention to provide a flexible economical method of reshaping a glass-ceramic article, even of different regions of the article in small scale production, especially a glass-ceramic cooking panel or a viewing window pane for an oven, range and fireplace, wherein the shaping can be locally limited and must have no large transitional radii and further the glass-ceramic plate underside can be either smooth or structured (e.g. knobbed) without damage.

This object and others, which will be made more apparent hereinafter, is attained in method of making a reshaped glass-ceramic article by forced reshaping of a corresponding flat green glass part during a ceramicizing process.

According to the invention the method comprises forced reshaping of a softened green glass part in a continuous furnace for ceramicizing the green glass part and in a section of this furnace, in which a viscosity of the green glass part is lowered temporarily on account of crystallization heat produced during ceramicizing.

In contrast to the above-described DE 101 02 576 A1 forced reshaping occurs in the case of the present invention in a continuous furnace, as is used for ceramicizing green glass plates. A special reshaping section is added to the furnace for this purpose. This continuous oven operates continuously in an economical manner.

The plates are thus inserted in the continuous furnace on one side, heated reshaped and ceramicized, and then taken out on the other side as a finished product, without the need to turn on and turn off the oven again.

The process according to the invention is similar to the known process according to the previously described EP 0 879 797, which is based on a definite temporary lowering of the viscosity during the ceramicizing. This viscosity lowering occurs immediately after the start of the crystal growth process. The viscosity reaches values of about $10^9$ to $10^{12}$ dPas. In contrast to the process according to the previously described EP 0 879 797 the conversion process does not occur because of the action of gravity alone, but also because of the targeted forced reshaping.

In contrast to the methods in the prior art with the method according to the invention it is possible to shape or mold different regions of glass-ceramic plates, especially glass-ceramic cooking surfaces or viewing windows for ovens, ranges and fireplaces, in many different ways in a very economical manner both in large scale production and also for special products, which are produced in small numbers. The shaping can be both locally limited and full-surface and have tight radii or other transitional radii, according to the forced reshaping tool action. The glass-ceramic plate underside can be smooth or structured (e.g. knobbed). The glass-ceramic parts to be reshaped can be fed through the continuously operating ceramicizing furnace in any arbitrary sequence, even alternating with smooth glass parts.

The forced reshaping can be performed in different ways.

According to a first embodiment of the invention the method comprises placing the flat green glass part in a hollow mold and drawing it into the hollow mold by producing a low pressure or vacuum in the hollow mold when its viscosity is lowered, assisted by the force of gravity.

This first embodiment of the method is preferred in large-scale shaping.

According to a second embodiment of the invention the method comprises placing the flat green glass part in at least one reshaping device provided with movable reshaping tools and activating the tools by means of low pressure or an overpressure when the viscosity of the flat green glass part is lowered locally so that a surface of the softened glass is forced out to form a raised region.

This second embodiment of the method is preferred for locally limited shaping.

The invention also includes an apparatus for performing these methods, which comprises a continuous furnace for performing the ceramicizing process and a hollow mold or a reshaping device, on which the flat green glass part is placed, which has at least one activating opening. The continuous furnace is provided with at least one lateral opening for temporarily inserting at least one activating line for connection or docking with the hollow mold or the reshaping device in the at least one activating opening in a sealed manner, so that the hollow mold can be evacuated or pressurized.

The invention also includes reshaped glass-ceramic articles made by a method comprising forced reshaping of flat green glass parts during ceramicizing of these green glass parts. The reshaping takes place according to the methods claimed in the claims appended below and described above. These reshaped glass-ceramic articles have surfaces corresponding without damage to the surfaces formed during making of the flat green glass parts.

BRIEF DESCRIPTION OF THE DRAWING

The objects, features and advantages of the invention will now be described in more detail with the aid of the following description of the preferred embodiments, with reference to the accompanying figures in which.

DETAILED DESCRIPTION OF THE INVENTION

Figure 1A:
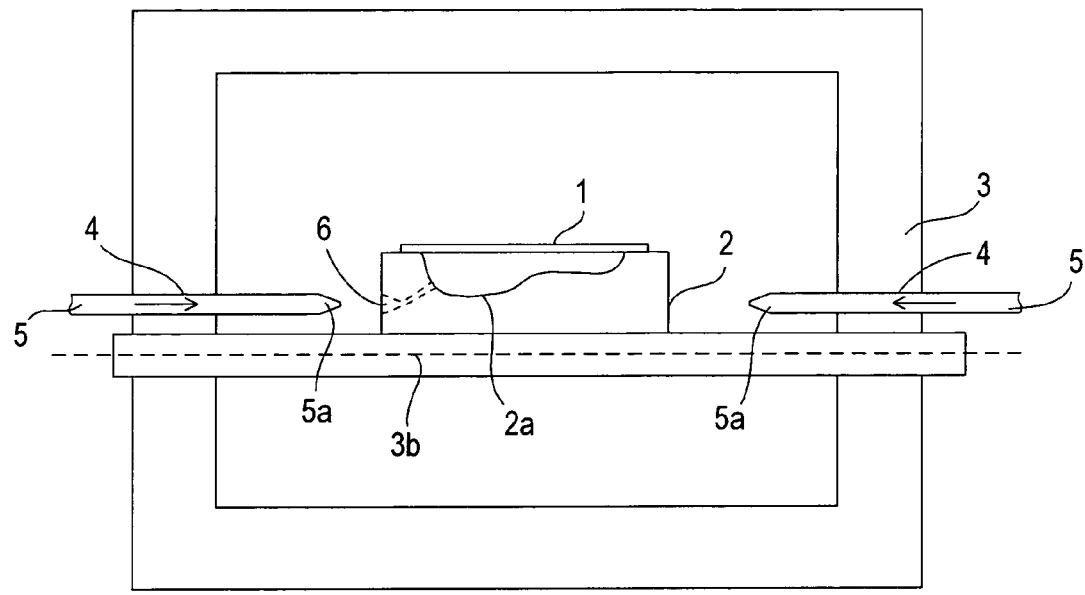
FIG. 1A is a cross-sectional view through a first embodiment of an apparatus according to the invention for performing the method according to the invention, which comprises a continuous ceramicizing furnace and a hollow mold, in which a flat green glass plate to be ceramicized is placed, which is transported through the furnace according to a ceramicizing program and in which a low pressure is produced in a section of the furnace, in which exothermic crystal growth takes place.

FIGS. 1A, 1B and 2A, 2B show a continuous ceramicizing furnace 3, which can be in the form of a grating furnace or roller furnace. A hollow mold 2 is introduced into the continuous ceramicizing furnace 3. The green glass article or plate 1 to be ceramicized is placed in the hollow mold 2. The green glass plate 1 can be made by rolling or according to a float process. The hollow mold 2 has a molding surface 2a with a shape that corresponds to or is suitable for the desired reshaping.

The hollow mold 2 with the green glass plate 1 is conveyed in a known manner for thermal ceramicizing treatment through the continuous ceramicizing furnace 3 by means of a symbolically represented conveyor belt 3b or the like. The hollow mold 2 with the green glass plate 1 is stopped in that region of the continuously ceramicizing furnace 3, in which the exothermic crystal growth occurs. Because of that the green glass plate 1 experiences a temporary viscosity lowering. Movable vacuum lines or conduits 5 are pushed through lateral openings 4 in a furnace section, in which exothermic crystal growth occurs, into previously prepared openings 6 in the hollow mold 2. The hollow mold 2 is evacuated by these vacuum lines 5 and because of that causes the softened glass on the mold to be drawn into the mold, assisted by the force of gravity. The vacuum connectors 5a on the tube ends of the vacuum lines 5 are formed (e.g. cone or ball shaped), so that they automatically center themselves in the openings 6 fitting their shape. Because of that a sufficient vacuum-tight connection arises for evacuation. The state of the reshaped glass and/or now glass-ceramic plate 1' is shown in FIG. 1B.

The stop or halt of the hollow mold 2 required for docking of the vacuum conduits or lines 5 in the hollow mold 2 can be provided when the hollow mold is accelerated in a furnace section upstream of a reshaping region RR so that subsequently sufficient time for the stop or halt for a short time interval results and the hollow mold 2 can be synchronized again to the normal furnace speed after the stopping stage. The continuous ceramicizing furnace 3 is preferably equipped with automatic slide gates upstream and downstream of the reshaping region RR, which can be moved into and moved out of the continuous ceramicizing furnace 3 to help maintain a uniform temperature distribution in this region.

Figure 2A:
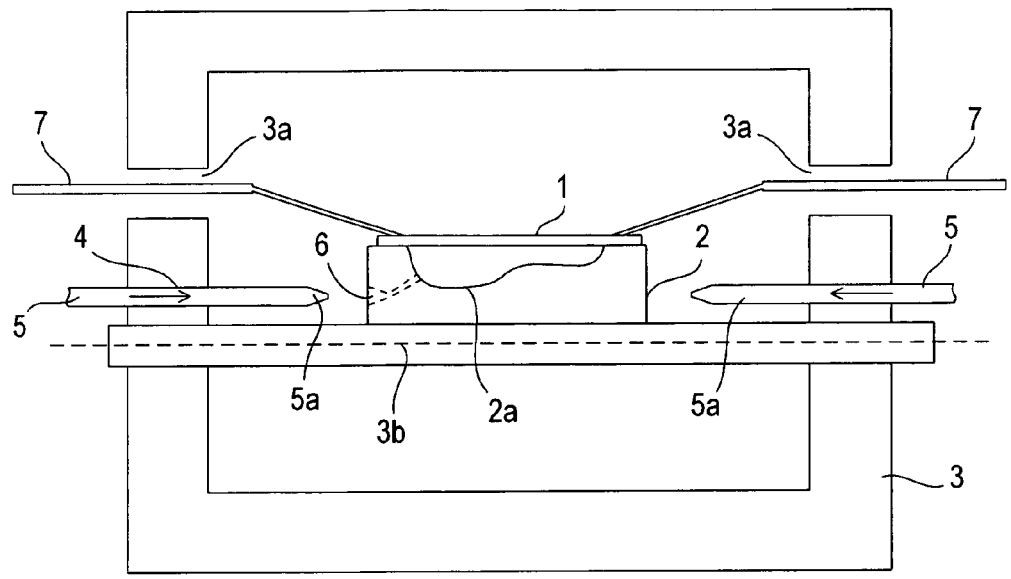
FIGS. 2A and 2B are cross-sectional views of an alternative embodiment of an apparatus for performing the method according to the invention, which is similar to that shown in FIGS. 1A and 1B and which is provided with additional lateral openings through which pressing and hold-down tools are inserted.
Figure 2B:
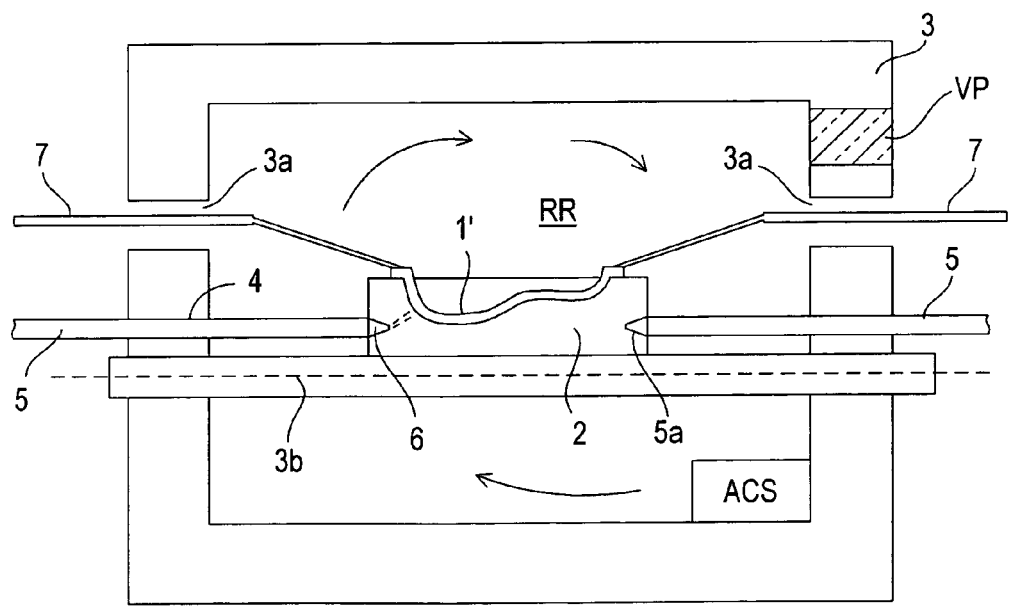

Furthermore the continuous ceramicizing furnace 3 is equipped with an air circulation system ACS for keeping the temperatures more uniform within the reshaping region RR, as shown in FIG. 2B.

Figure 1B:
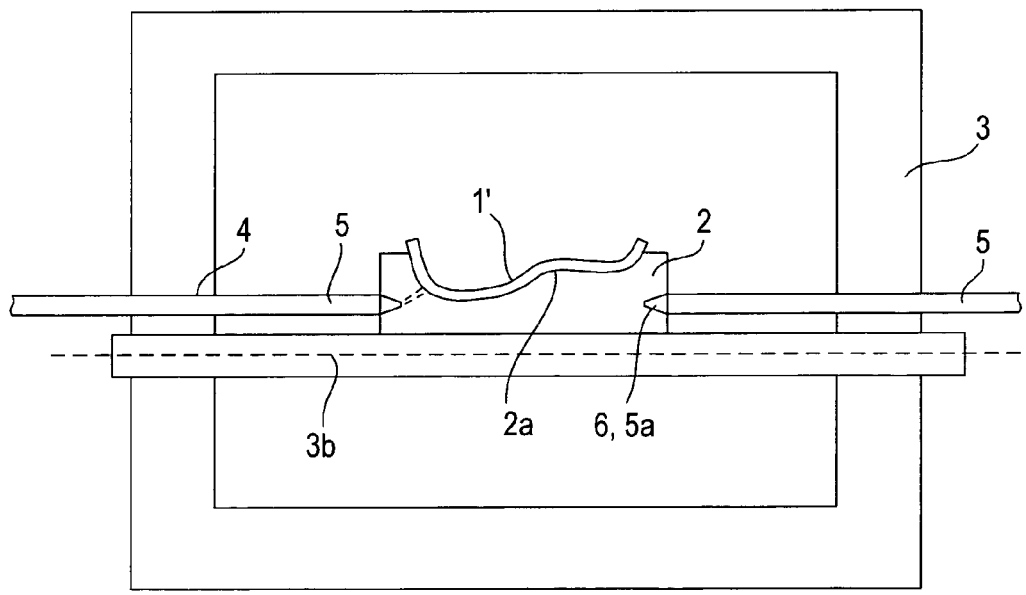
FIG. 1B is a cross-sectional view through the first embodiment of the apparatus shown in FIG. 1A, showing the reshaped green glass article resulting from the production of the low pressure during ceramicizing in the continuous furnace.

An alternative embodiment to that shown in FIGS. 1A and 1B is shown in FIGS. 2A and 2B, in which pressing and hold-down tools 7 can be inserted temporarily through the additional lateral openings 3a in the furnace section for reshaping, which cause reshaping alone or with additional assistance of an applied vacuum, especially at the edge regions of the glass-ceramic plate or which prevent unwanted bulges of the edge regions, which result from the sinking of the center portion into the mold due to the vacuum and/or the force of gravity.

Pressurized air lines or conduits are temporarily inserted through the additional lateral openings 3a in the furnace section in the reshaping zone, as described in FIGS. 1A and 1B for the vacuum lines, so that reshaping tools integrated in the mold, e.g. pressing elements or centering bolts, can be moved into the mold (not shown) alone and/or additionally to the action of the applied vacuum and/or the pressing and hold-down tools 7.

The reshaping process is preferably observed in the furnace section in which reshaping occurs or in the reshaping region RR by means of a furnace probe or a viewing window VP.

Figure 3A:
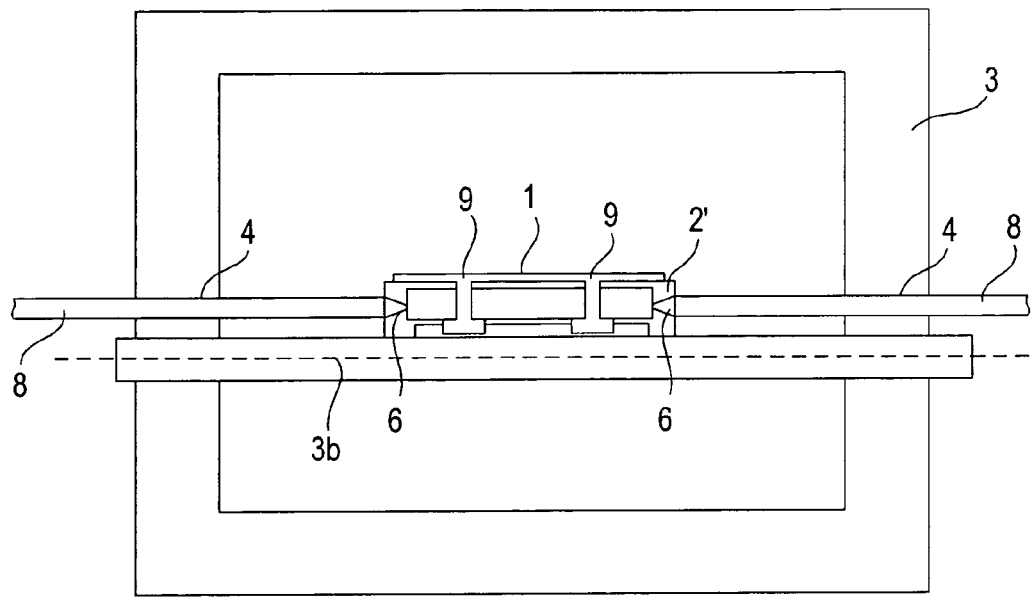
FIGS. 3A and 3B are cross-sectional views of another embodiment of an apparatus for performing the method according to the invention, which has two pressure-operated shaping tools, which are moved vertically by means of a vacuum or pressurized air and which locally reshape the green glass softened by the crystallization heat in areas to be raised or embossed.
Figure 3B:
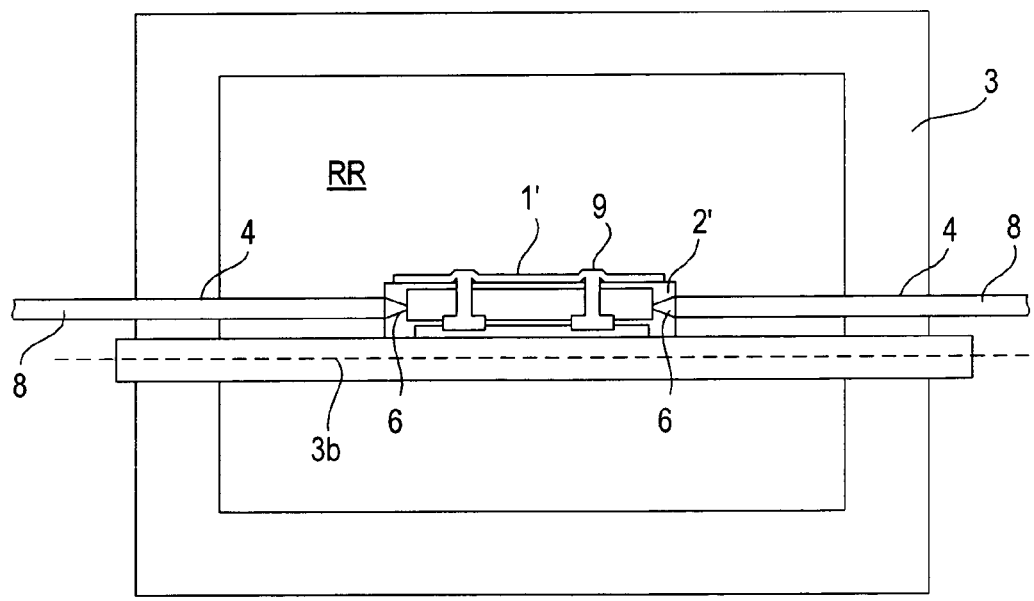

Another embodiment besides that shown in FIGS. 1A and 1B is shown in FIGS. 3A and 3B, in which the apparatus for performing the method has a reshaping device 2' with reshaping tools 9, e.g. two pressing elements, instead of the hollow mold 2. The green glass plate 1 to be reshaped is placed in the reshaping device 2' and transported through the furnace 3. The pressing elements are to be understood as only examples of movable reshaping tools 9 for forced reshaping, whose number is determined by the number of reshaping events performed on the green glass plate 1.

The reshaping device 2' has two activating openings 6, to which activating lines 8 are connected after they are inserted through openings 4 in the furnace section, in which the ceramicizing occurs. The green glass plate 1 can be held fixed by a vacuum in this reshaping device 2'. Hold-downs 7 according to FIG. 2A and 2B can also be used for this purpose.

The reshaping tools 9 can be moved vertically by means of a vacuum or low pressure or pressurized air supplied through the activating lines 8, which forces out an area of the surface of the softened green glass plate 1 locally to form a desired raised region, e.g. an operators' panel for a cooking surface.

Further description regarding this third embodiment would be the same as for the embodiments shown in FIGS. 1A and 1B and 2A and 2B and has therefore been omitted here.

The reshaped glass-ceramic part 1' can be the desired product, but it can also be divided up into a number of individual desired products.

The reshaped glass-ceramic parts are preferably used as cooking panels, especially for glass-ceramic cooking ranges, and for fireplace viewing windows or similar applications. The glass-ceramic parts made according to the invention have the advantages of improved aesthetic properties and/or increased strength because of the method of reshaping green glass parts made by rolling and float processes according to the invention, because of their undamaged smooth or structured surfaces, for example a knobbed lower or upper side.

The disclosure in German Patent Application 10 2004 008 595.1-45 of Feb. 21, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method for making reshaped glass-ceramic articles, apparatus for performing the method and glass-ceramic articles made thereby, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. An apparatus for making a reshaped glass-ceramic article (1') from a corresponding flat green glass part (1) during a ceramicizing process, wherein said apparatus comprises
    a continuous furnace (3) for performing the ceramicizing process;
    a reshaping device (2'), in which the flat green glass part (1) is placed, said reshaping device (2') having at least one activating opening (6); and
    reshaping tools (9) arranged in the reshaping device (2');
    wherein the continuous furnace (3) is provided with at least one lateral opening (4) for temporarily inserting at least one activating line (8) for connecting the at least one activating line (8) in the at least one activating opening (6) of the reshaping device (2') in a sealed manner;
    wherein the at least one activating line (8) comprises a vacuum line that has a cone-shaped or ball-shaped vacuum connector that automatically centers itself in said at least one activating opening (6) in the reshaping device (2') when the at least one activating line is connected with the at least one activating opening in said sealed manner; and
    wherein said reshaping tools (9) are movable vertically in the reshaping device (2') by means of a vacuum supplied to the reshaping device (2') by said at least one activating line (8) when the at least one activating line is connected with the at least one activating opening in said sealed manner.

2. The apparatus as defined in claim 1, wherein the continuous furnace (3) has a conveying device (3b) for the reshaping device (2') and means for halting or changing speed of the conveying device (3b).

3. The apparatus as defined in claim 1, wherein said at least one lateral opening (4) for temporary insertion of the at least one activating line (8) is provided in a reshaping region (RR) of the continuous furnace (3) in which exothermic crystal growth occurs in the flat green glass part (1) during ceramicizing.

4. The apparatus as defined in claim 3, further comprising automatic slide gates upstream and downstream of the reshaping region in the continuous furnace (3), which are moveable into and out of the continuous furnace to assist in producing uniform temperatures in the reshaping region.

5. The apparatus as defined in claim 4, wherein the continuous furnace (3) is equipped with an air circulation system (ACS) for keeping the temperatures more uniform within the reshaping region (RR).

6. The apparatus as defined in claim 3, further comprising a furnace probe or viewing window (VP) for observation in the continuous furnace (3) in a furnace section in which the reshaping region (RR) is located.

7. The apparatus as defined in claim 1, wherein the reshaping device (2') is formed so that the vacuum supplied to the reshaping device acts to hold or fix the flat green glass part (1) in the reshaping device (2').

8. The apparatus as defined in claim 1, wherein the reshaping tools (9) are upwardly movable pressing elements and said pressing elements move upward to force an area of the flat green glass part out locally to form a raised region during reshaping when the vacuum is supplied to the reshaping device.

* * * * *